United States Patent [19]

Pryor

[11] 4,422,063
[45] Dec. 20, 1983

[54] SEMICONDUCTOR STRAIN GAUGE
[75] Inventor: Roger W. Pryor, Trumbull, Conn.
[73] Assignee: Pitney Bowes Inc., Stamford, Conn.
[21] Appl. No.: 364,557
[22] Filed: Apr. 1, 1982
[51] Int. Cl.³ .............................................. G01L 1/22
[52] U.S. Cl. ........................................ 338/2; 357/2; 357/26
[58] Field of Search ........................................ 338/2-5; 357/2, 26; 73/720, 721, 726, 727

[56] References Cited

U.S. PATENT DOCUMENTS 3,392,576  7/1968  Hollander, Jr. ................. 357/26 X
3,451,030  6/1969  Ganfinkel ........................ 357/26 X

*Primary Examiner*—C. L. Albritton
*Attorney, Agent, or Firm*—Melvin J. Scolnick; Albert W. Scribner; William D. Soltow, Jr.

[57] ABSTRACT

A semiconductor strain gauge comprises an elastic member having a surface subject to stress; a semiconductor substrate secured to the elastic member and including at least one PN junction wherein both the P type and N type material is composed of amorphous semiconducting material; and an electrical connection for conducting a signal indicative of strain.

7 Claims, 1 Drawing Figure

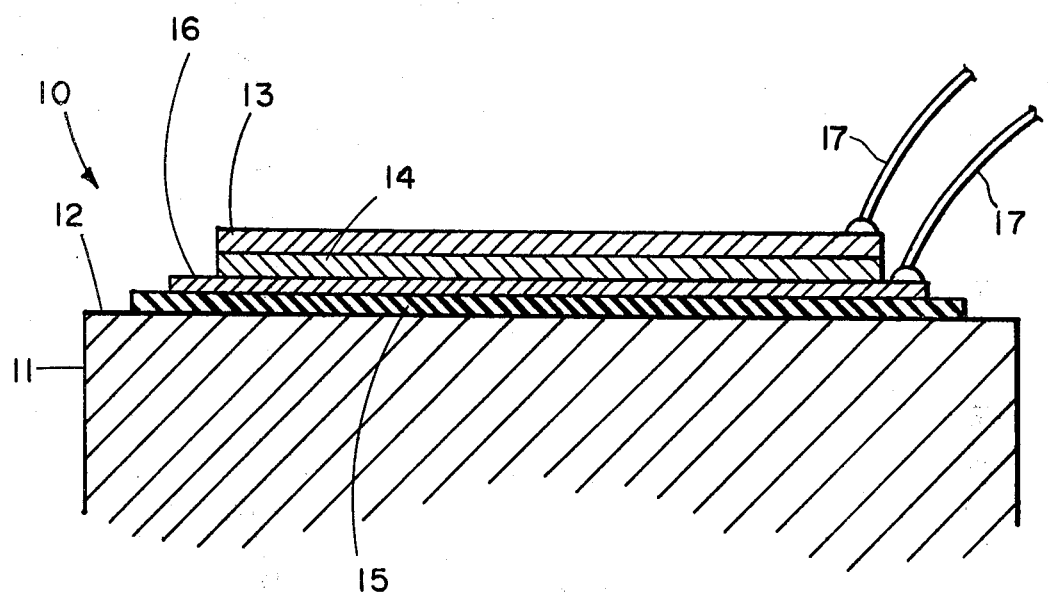

SEMICONDUCTOR STRAIN GAUGE

BACKGROUND OF THE INVENTION

1. Field of the Invention

The present invention relates to a semiconductor strain gauge that may be employed in various types of transducers such as motion sensing devices, scales and other instruments for measuring movements, forces and pressures, and more particularly to an improved semiconductor strain gauge wherein the semiconductor substrate includes at least one PN junction where both the P type and N type material is composed of amorphous semiconducting material.

2. Description of the Prior Art

The prior art contains many examples of strain gauges, i.e., a device that is used to measure displacement, forces or other physical phenomena which produce strain in the device. Once such type of strain gauge employs a strain sensitive metallic wire as the translating element. This element, when subjected to stress, undergoes a change in its overall electrical resistance. It is this change in resistance which is measured to thereby determine the magnitude of the applied force which has produced the stress. In an attempt to increase the sensitivity of these gauges (i.e., the change in resistance produced by the strain in the element) the use of crystalline semiconductor elements were adopted. It is well known that a semiconductor crystal with a specific direction of crystal axis exhibits a piezoresistive effect, i.e. a change in resistivity caused by an applied stress. This piezoresistive effect is part of the nature of the semiconductor material and has allowed crystalline semiconductor material to be used in strain gauges which are more effective than the gauges formed of a metallic material. In fact, it is well known that a semiconductor strain gauge utilizing the piezoresistive properties of a crystalline semiconductor material has an output sensitivity several ten's of times as high as that of a conventional metallic wire strain gauge. Examples of these semiconductor strain gauges can be found in U.S. Pat. Nos. 3,084,300; 3,312,790; 3,719,913; 3,673,354; 3,705,993; 3,922,705; 3,940,730; 4,047,144; 4,151,502; 4,203,327; 4,234,361 and 4,292,618.

Although strain gauges using crystalline semiconductor material represent a large improvement over the conventional strain gauge that employs a metallic wire, known crystalline semiconductor type gauges present certain disadvantages. For example, the crystalline semiconductor materials are very sensitive to impurities which often cause inaccuracies when used in a measuring device. These materials exhibit some problems with regard to their predictable resistance. Also, there are problems of reduced sensitivity when the semiconductor material is bonded via various bonding agents, e.g. organic resins, etc., to the material being strained. Furthermore, because of various difficulties that are encountered in controlling the curing of adhesives ordinarily used to bond the semiconductor material to the material being strained, inconsistent results are often obtained. Thus, known crystalline semiconductor strain gauges exhibit definite problems with respect to sensitivity, precision and reliability.

SUMMARY OF THE INVENTION

It is therefore an object of the present invention to overcome many of the disadvantages of the type of semiconductor strain gauges disclosed by the prior art.

It is a primary object of the present invention to provide a semiconductor strain gauge which has increased sensitivity as compared to the gauges described in the prior art.

It is a further object of the present invention to provide a semiconductor strain gauge formed of a semiconductor material that is not critically sensitive to impurities and which is easily deposited onto a substrate with repeatable properties.

It is a further object of the present invention to provide a semiconductor strain gauge that can be manufactured at a significantly reduced cost as compared to known semiconductor strain gauges.

It is still a further object of the present invention to provide a semiconductor strain gauge that can be easily manufactured without the use of adhesive bonding agents.

The foregoing objects and others are accomplished in accordance with the present invention by providing a semiconductor strain gauge comprising an elastic member having a surface subject to stress; a semiconductor substrate secured to the surface, the substrate including at least one PN junction wherein both the P type and N type material is composed of amorphous semiconducting material; and electrical connection means for conducting a signal indicative of strain.

In accordance with the present invention a new and improved method of measuring strain is accomplished by using the strain induced effects associated with the minority carriers population of amorphous semiconductor material. In conventional use, both majority and minority carriers are lumped together in the value of the resistance as follows: $R = \rho L/A =$ Resistance; $\rho = 1/\sigma = 1/$conductivity; $\sigma = e(\eta_e \mu_e + \eta_H \mu_H)$; $e = -$ charge of electron, $\eta_e = \#$ of electrons; $\eta_H = \#$ of holes; $\mu_e =$ mobility of electrons; $\mu_H =$ mobility of holes. If any of the parameters change (i.e. by viture of strain), the resistance changes. These changes, in absolute value, are generally small since only low values of uniaxial strain can normally be induced in solids. However, since the number of minority carriers is so small in comparison to the number of majority carriers, and the change in the absolute number of carriers available is symmetric in holes and electrons (the same number of holes and electrons are generated under strain), the change as reflected in the minority carrier behavior is large relative to the absolute number of minority carriers and is small relative to the absolute number of majority carriers. If the semiconductor material is fabricated into a PN junction device as described hereinbelow in accordance with the present invention, and reverse biased, such changes become measurable as a significant change in the leakage current.

The advantages that amorphous semiconductors have over single-crystal semiconductors when considering this type of materials use in a PN junction type of load cell are that the amorphous semiconducting materials further increase the sensitivity of the device. The amorphous materials can be fabricated as a homogeneous, isotropic alloy with a temperature coefficient that is compatible with a ceramic (glass) substrate. These amorphous materials are well behaved, stable semiconductors with predictable resistance as a function of temperature. These materials are not as sensitive to impurities as are crystalline semiconductors, and are easily deposited with repeatable properties by, for example, sputtering. One of the most significant factors is that the use of an amorphous semiconductor material offers the possibility of a superior transducer at a significantly reduced cost (less labor intensive, batch fabrication). The use of this material also offers a significant reduction in the cost of the front end electronics and power supplies as compared to those required for a metallic gauge load cell scale by virtue of their higher gauge factor (approximately 10-20). Estimates indicate that weigh meter costs might be reduced as much as to 60% of those of presently used load cell scales.

BRIEF DESCRIPTION OF THE DRAWINGS

For a better understanding of the invention as well as other objects and further features thereof, reference is made to the following detailed disclosure of this invention taken in conjunction with the accompanying drawing wherein:

The FIGURE is a plan diagram for explaining the general construction and concept of an embodiment of a semiconductor strain gauge according to the present invention.

DESCRIPTION OF THE PREFERRED EMBODIMENTS

Referring now to the FIGURE there is shown in accordance with the present invention a semiconductor strain gauge 10. The strain gauge shown comprises an elastic base member 11 that includes an upper surface 12 that can be subject to stress. For example, member 11 can be any material which is elastic to some degree, i.e. a material having a high to a relatively low modules (e.g., from steel to plastic). The member can represent, for example, a cantilever which is displaced when a force is applied thereto. The gauge includes a semiconductor substrate secured to surface 12 of member 11 that includes at least one PN junction including a P type semiconducting material 13 and an N type semiconducting material 14. The semiconductor substrate can be formed of a multijunction structure. Thus, for example, the substrate can comprise an N-P-N or P-N-P semiconductor structure. In accordance with the critical feature of the present invention the semiconducting substrate is formed of amorphous semiconducting materials. The amorphous semiconducting materials that are used are ones that are piezoresistive, i.e. the resistivity of the material changes as a function of strain.

The major distinguishing characteristic of known prior art strain gauges which employ crystalline semiconducting material is that the crystal material has its constituent atoms or molecules aligned in ordered three-dimensional arrays that exhibit a long-range periodicity. The present invention employs amorphous semiconducting material which by definition in accordance with the present invention is nonperiodic and has predominately short range order. Examples of the type of amorphous semiconductor materials which can be used include silicon, gernianium, silicon-germanium alloys, P and N type silicon, P and N type germanium, and alloys of P and N type silicon and germanium, all of which are known semiconducting materials. The amorphous semiconductor material dopants can include such materials as arsenic, boron, phosphorous, etc.

In those strain gauges where electrical shorting is possible (e.g. the base member is a metal) it is necessary to electrically insulate the amorphous semiconducting substrate from the elastic base member 11 by a thin layer of an electrical insulating material 15. If the insulating material is directly deposited the base member 11 by, for example, a sputtering or evaporation deposition technique, the layer should be of a sufficient thickness so that there are no pin holes in the layer, i.e. a thickness range of from about 100 to about 200 angstroms would be sufficient to accomplish this result. If the insulating layer is not directly deposited on the base member, but for example, is formed of a separate layer of insulating material that is bonded onto the base member, then the layer should be of a thickness ranging from about 10 to about 40 microns. Preferably positioned between the semiconducting substrate and insulating material 15 is a layer of material 16 that is electrically conductive for the purpose of making electrical contact with the P-N junction in the manner as explained hereinbelow.

Semiconductor strain gauge 10 is connected with lead wires 17 which serve a dual purpose. First, these wires provide the means across which reverse bias voltage can be applied to the semiconducting substrate for the purpose of gathering the minority carriers. Thereafter a strain is applied across base member 11. Wires 17 can then be connected to an external electrical instrument (not shown) which records or measures changes in the resistivity of the amorphous semiconducting substrate that occur as member 11 is subject to strain.

One of the basic advantages of the present invention is that it lends itself to the use of a deposition technique for the application of the amorphous semiconducting substrate to the base member. Two well known deposition techniques can be used, i.e. sputtering and plasma deposition. The sputtering process can be used with a very large range of materials and will almost completely maintain the original composition and properties of the material. Gauges fabricated by this process have proven to be the most stable, accurate gauges made thus far. They have a broader temperature range and are environmentally harder than other gauges. Gauges made by these processes in accordance with the present invention can be directly atomically bonded to the substrate, thus eliminating the hysteresis of the glue and intermediate substrate of the foil gauges.

I claim:

1. A semiconductor strain gauge comprising: an elastic member having a surface subject to stress; a semiconductor substrate secured to said surface, the substrate including at least one PN junction wherein both the P type and N type material is composed of amorphous semiconducting material; and electrical connection means for conducting a signal indicative of strain.

2. A semiconductor strain gauge according to claim 1 wherein said semiconductive substrate is a multijunction element formed of amorphous N-P-N semiconductor materials.

3. A semiconductor strain gauge according to claim 1 wherein said semiconductor substrate is a multijunction element formed of amorphous P-N-P semiconductor materials.

4. A semiconductor strain gauge according to claim 1 further comprising a thin electrical insulating layer separating said member from said amorphous material.

5. A semiconductor strain gauge according to claim 4 further comprising a layer of an electrically conductive material between said amorphous material and said insulating layer.

6. A semiconductor strain gauge according to claim 5 wherein said electrical connection means is attached to the gauge on said amorphous material and on said conductive material.

7. A semiconductor strain gauge according to claim 1 wherein said amorphous material is secured to said elastic member by an atomic bond.

* * * * *